July 1, 1969

E. E. STOECKLY 3,453,443

GAS TURBINE MOBILE POWERPLANT

Filed July 28, 1966

INVENTOR:
EUGENE E. STOECKLY,
BY Robert J. Bird
HIS ATTORNEY.

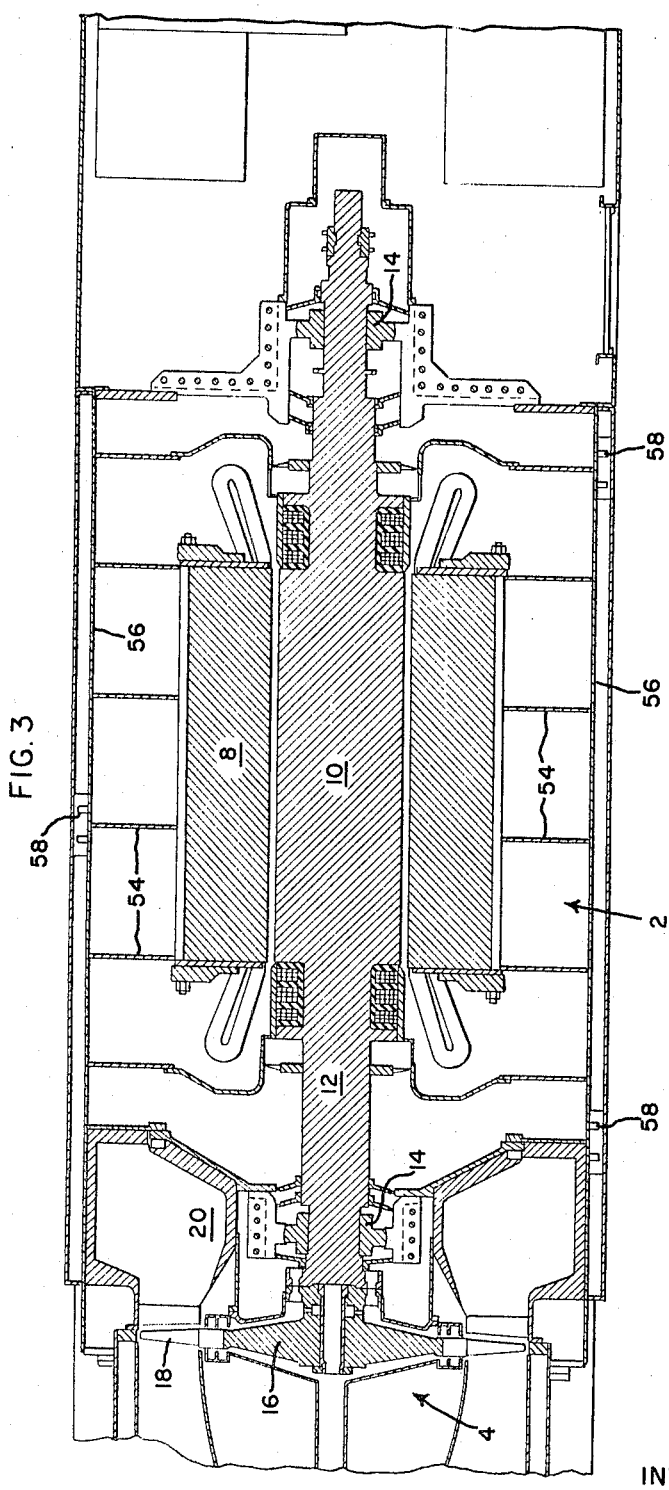

United States Patent Office
3,453,443
Patented July 1, 1969

3,453,443
GAS TURBINE MOBILE POWERPLANT
Eugene E. Stoeckly, Cincinnati, Ohio, assignor to General Electric Company, a corporation of New York
Filed July 28, 1966, Ser. No. 568,472
Int. Cl. F01k 15/02
U.S. Cl. 290—2   6 Claims

ABSTRACT OF THE DISCLOSURE

A mobile gas turbine-generator powerplant having individual gas generators mounted atop a large capacity electric generator with a turbine wheel attached to the electric generator shaft. The powerplant being mounted at three points on a frame and wheeled carriages constituting a railroad car.

---

Figure 1:
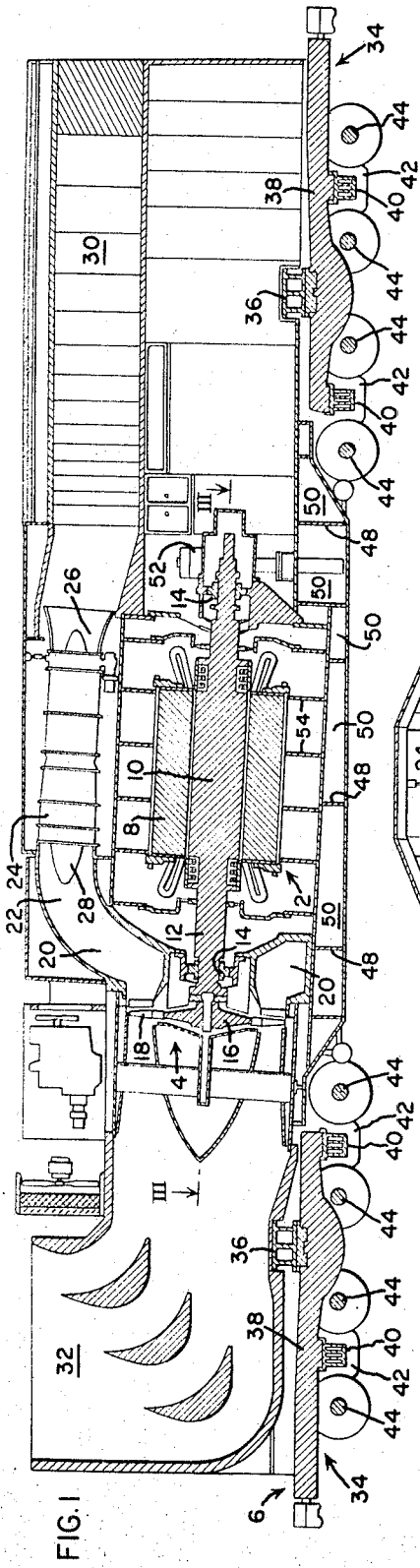

The present invention relates to gas turbine driven electric powerplants to be used for auxiliary or emergency power. More particularly, the present invention relates to a portable or mobile gas turbine powerplant which may be used for normal peaking service and which is also transportable to an area in need of emergency electric power. For flexibility and reliability in the power generation industry, it has become desirable to provide sizable blocks of standby electric power generation capability in transportable units. Small portable electric powerplants are well known and have long been used in agriculture and industry. However, mobile powerplants having ratings of such size as to be useful to the power generation industry itself have heretofore been unavailable. That is to say, that it has up to now not been practicable to design a powerplant of substantial capacity and at the same time make it transportable on any presently known land transportation means.

Accordingly, it is an object of the present invention to provide a gas turbine-generator powerplant which is completely self-contained and mounted on a transportable platform.

Another object is to provide a transportable power generation plant which is physically within the limits of the transportation system and yet provides a greatly improved generation capacity.

Other objects, advantages and features of the present invention will be apparent from the following description thereof when taken in connection with the accompanying drawings.

Briefly stated, the present invention is practised in one form by a gas turbine-generator powerplant mounted on a railroad flatcar. A turbine load wheel is overhung on a generator shaft. The turbine input motive fluid is derived from the exhaust of three gas generators of the aircraft turbine type mounted atop the generator. The entire unit is mounted on a minimum of support points by a three point support relative to a frame, which is in turn mounted on two transverse bearings relative to wheeled carriages, the frame and carriages constituting a railroad car. The mobile powerplant is completely self-contained on its flatcar, including a fuel supply.

Figure 2:
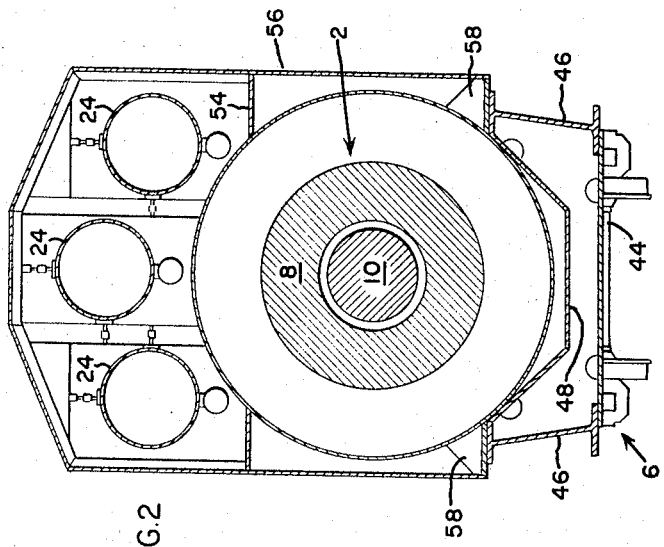

In the drawing:

FIG. 1 is a longitudinal sectional view of the mobile powerplant of the present invention, FIG. 2 is a simplified view looking in an axial direction showing the basic arrangement of the powerplant of this invention, and FIG. 3 is a partial sectional view taken along the line III—III of FIG. 1.

Referring now to FIG. 1, a mobile power generation plant is shown generally including an AC generator 2 driven by a gas turbine 4 and mounted on a railroad car 6. Generator 2 includes a stator 8 and a rotor 10 mounted on rotor shaft 12 and rotating within stator 8 on two bearings 14. Typically, generator 2 may be a standard two-pole air-cooled AC generator having a rating upwards of 30,000 kw.

The prime mover for generator 2 is a gas turbine 4 which includes a turbine load wheel 16 mounted on an extension of the generator shaft 12 and overhung relative to generator shaft bearing 14. Communicating with turbine rotor buckets 18 mounted on turbine load wheel 16 is a turbine inlet duct or scroll 20. Leading into turbine inlet scroll 20 are three separate transition ducts 22 which in turn are in communication with the exhaust ends of three separate gas generators 24. Gas generators 24 are slightly modified aircraft gas turbine engines of the type commonly known as "jet engines," only their casings being shown at 24. Each of the gas generators 24 has its intake or compressor end shown at 26 and its turbine or exhaust end shown at 28. A common inlet silencer duct 30 communicates with the inlet end 26 of each of the gas generators 24. Gas generators 24 are mounted on top of, and in an arcuate arrangement relative to, the generator 2. The axes of gas generators 24 are substantially parallel to the axis of generator rotor 12. This can be more clearly seen from FIG. 2. Downstream of gas turbine rotor buckets 18 is the common gas turbine exhaust duct 32.

The railroad car and the support for this gas turbine powerplant will now be described. At each end of the car there is a four-axle truck or carriage 34. The entire weight of the powerplant and its frame rests upon two transverse bearings 36, one near each end of the car. The load on each transverse bearing 36 is transferred by a span bolster 38 to centerline bearings 40 on each of the two-axle trucks which are spanned by each bolster 38. Centerline bearings 40 in turn transmit the weight thereon to span members 42 which in turn rest upon the individual axles 44. Thus, the entire load is transmitted from two bearings 36 evenly to the eight axles on the railroad car. Mounted on bearings 36 is the frame which supports the powerplant. For a clearer understanding of the mounting system of this invention, it may be helpful to think of the railroad car as comprising nothing more than the two four-axle trucks 34, i.e., members 36, 38, 40, 42 and 44, together with the frame.

The powerplant frame comprises longitudinal I beams 46 (see FIG. 2) and transverse plates 48 (see FIG. 1) connecting the I beams. In the spaces between transverse plates 48 and in communication with one another are fuel tanks 50, into which extends the suction line from main turbine fuel pump 52. A starting fuel pump (not shown) may discharge from fuel tanks 50 directly into the suction line of pump 52.

The generator 2, gas turbine 4, gas generators 24, and related equipment are structurally united by transverse plates such as 54 and by longitudinal plates as shown at 56. There are three support brackets 58 integral with the support structure 54, 56 of the gas turbine-generator powerplant (FIGS. 2 and 3). These three support brackets 58 are the sole mounting supports by which the powerplant is mounted on its frame.

The operation of the present invention will now be described. First, considering the mobile platform, the frame is supported on the four-axle trucks by the two transverse bearings 36. Relative to the frame, the powerplant is thereon supported by the three support brackets 58. And, within the powerplant, the turbine and generator rotors are supported by the two rotor bearings 14. This minimum of support points enables the railroad car to negotiate a curve of a radius as small as 120 feet without incurring any problems of misalignment or bending in the powerplant structure. Next, considering the powerplant itself, the individual gas generators 24, which are themselves gas turbines, are individually operative and discharge high energy exhaust gases into their separate transition ducts 22 from which the gases merge in the turbine inlet scroll 20. The expansion of this motive fluid through the rotor buckets 18 is the motive force for the turbine load wheel 16 and from the rotor buckets 18 the motive fluid exhaust gases proceed through the exhaust duct 32 and into the atmosphere. Gas turbine 4, being direct-connected to generator rotor 10, is the prime mover for the generator 2. Individual gas generators 24, being of the aircraft jet engine type, provide a maximum of exhaust gas in a minimum of space. This is the reason for their use on aircraft, and it is the reason for their use in this invention. Within the size limitations of a standard railroad flat car, the amount of power available from the powerplant of the present invention compares by a factor of over 3 with the amount of power which would be producible by any other known means of power generation in the same size and mobility limitation. Gas generators 24 are separately removable and replaceable, and the powerplant is capable of operation (at a reduced output, of course) with one or two of its gas generators removed in the event that it becomes necessary to remove them.

In one embodiment of the present invention, a powerplant rated at 34,000 kw. at 80° F. and 1000 feet altitude, and 41,500 kw. at 0° F., is possible of accomplishment on a railroad flatcar as described. The fuel tanks 50 located in the frame have a capacity for approximately one-half hour's operation at the above rating. The plant is entirely self-sustaining and requires no external connections or services, subject only to the limitation of the aforementioned half-hour fuel supply. The plant can operate on kerosene, diesel oil, or jet propellant. A bare minimum of support points, specifically the two rotor bearings, the three-point support between the frame and the powerplant, and the two transverse bearings between the car and the frame, have greatly simplified the problems of alignment, turning, and general flexibility of the entire system. The fact that the gas generators are mounted atop the electrical generator and not axially displaced therefrom, optimizes the use of available linear space.

Thus, it will be appreciated that a mobile powerplant has herein been described which has a greatly improved power generation capacity and which is accessible when and where it is needed in times of power shortages.

Many articles of equipment and many elements of structure are shown in the drawings and are a part of the powerplant herein described. But, since many of them are standard and known in the art, they are not essential to an understanding of the present invention, and have thus not been described or labeled.

It will occur to others of ordinary skill in the art to make modifications of the present invention which will lie within the scope and concept thereof. As one example, two gas generators might well be used rather than three as disclosed. Or, the railroad car might employ two three-axle trucks rather than four-axle trucks as disclosed. Therefore, it is desired that the invention be not limited by the details in which it has been described but that it encompass all within the purview of the following claims.

What is claimed is:
1. A mobile gas turbine-generator powerplant comprising:
an electric generator having a stator, a rotor, and a rotor shaft mounted between two rotor bearings,
a gas turbine wheel having buckets mounted thereon, said wheel being mounted on said rotor shaft adjacent one of said rotor bearings,
a turbine inlet scroll disposed in communication with said turbine buckets,
a plurality of individually-operative gas turbines mounted atop said electric generator and on axes substantially parallel with the axis of said electric generator, each of said gas turbines having a transition duct communicating with said turbine inlet scroll, and
a mobile mounting attached to said powerplant.
2. A mobile powerplant according to claim 1 in which there are two of said gas turbines.
3. A mobile powerplant according to claim 1 in which said gas turbines are arcuately situated relative to said electric generator.
4. A mobile powerplant according to claim 1 in which: there are two of said rotor bearings,
said gas turbine wheel being mounted in overhung relationship to one of said rotor bearings,
said mobile mounting comprises a frame supported on a plurality of wheeled carriages,
said powerplant being mounted on three points relative to said frame.
5. A mobile powerplant according to claim 4 in which said frame and said wheeled carriages constitute a railroad car.
6. A mobile gas turbine-generator powerplant comprising:
an electric generator having a stator, a rotor, and a rotor shaft mounted between two rotor bearings,
a gas turbine wheel having buckets mounted thereon, said wheel being mounted on said rotor shaft adjacent one of said bearings and overhung relative thereto,
a turbine inlet scroll disposed in communication with said turbine buckets around the periphery of said turbine wheel,
three individually-operative gas turbines mounted in an arcuate array atop said electric generator and on axes substantially parallel with the axis of said electric generator, each of said gas turbines having a transition duct communicating with said turbine inlet scroll,
said powerplant mounted on three points relative to a frame,
said frame mounted on a plurality of wheeled carriages,
said frame and said carriages constituting a railroad car.

References Cited

UNITED STATES PATENTS

| | | | |
|---|---|---|---|
| 2,491,200 | 12/1949 | Newton et al. | |
| 2,566,618 | 9/1951 | Lindsey | 290—52 |
| 2,575,242 | 11/1951 | Allen. | |
| 2,637,277 | 5/1953 | Alforfer. | |
| 2,648,491 | 8/1953 | Wood | 290—52 |
| 2,853,638 | 9/1958 | Bonnano et al. | |
| 2,972,055 | 2/1961 | Zaba | 290—52 |
| 3,169,366 | 2/1965 | Clark et al. | 60—39.37 |
| 3,274,395 | 9/1966 | Rizk | 290—52 |

ORIS L. RADER, *Primary Examiner.*

G. R. SIMMONS, *Assistant Examiner.*

U.S. Cl. X.R.

60—39.37; 290—52